United States Patent [19]

Lutz et al.

[11] 4,130,501
[45] Dec. 19, 1978

[54] STABLE VISCOUS HYDROGEN PEROXIDE SOLUTIONS CONTAINING A SURFACTANT AND A METHOD OF PREPARING THE SAME

[75] Inventors: Charles W. Lutz, Princeton; Leon E. Cohen, Somerset, both of N.J.

[73] Assignee: FMC Corporation, Philadelphia, Pa.

[21] Appl. No.: 724,780

[22] Filed: Sep. 20, 1976

[51] Int. Cl.$^2$ ............................................. C01B 15/02
[52] U.S. Cl. ...................................... 252/186; 252/95; 252/316
[58] Field of Search ........................ 252/186, 95, 316; 424/62

[56] References Cited

U.S. PATENT DOCUMENTS

| | | | |
|---|---|---|---|
| 2,875,153 | 2/1959 | Dalton | 252/132 |
| 2,958,665 | 11/1960 | Easton | 252/316 |
| 3,011,950 | 12/1961 | Mehaffey | 252/90 |
| 3,058,916 | 10/1962 | Sinner et al. | 252/99 |
| 3,101,301 | 8/1963 | Siegal et al. | 167/87 |
| 3,388,069 | 6/1968 | Lindner et al. | 252/186 |
| 3,499,844 | 3/1970 | Kibbel et al. | 252/186 |
| 3,909,438 | 9/1975 | Nakagawa | 252/186 |

OTHER PUBLICATIONS

"Pluronics", A Publication of Wyandotte, Apr. 23, 1958, p. 2.

*Primary Examiner*—Benjamin R. Padgett
*Assistant Examiner*—Deborah L. Kyle
*Attorney, Agent, or Firm*—Robert W. Kell; Frank Ianno

[57] ABSTRACT

A stable viscous liquid bleach that may be safely applied directly to stubborn stains is prepared by adding certain anionic or nonionic surfactants to aqueous solutions containing up to 30% by weight hydrogen peroxide. The viscosity of the aqueous hydrogen peroxide solution is adjusted to be within the range of about 60 cps - 6,000 cps by addition of a water dispersible copolymer of an alpha-beta monoolefinically unsaturated lower aliphatic carboxylic acid crosslinked with a polyether of a polyol selected from the class consisting of oligo saccharides, reduced derivatives thereof in which the carbonyl group is converted to an alcohol group and pentaerythritol, the hydroxy groups of said polyol which are modified being etherified with allyl groups, said polyol having at least two allyl groups per polyol molecule.

14 Claims, No Drawings

STABLE VISCOUS HYDROGEN PEROXIDE SOLUTIONS CONTAINING A SURFACTANT AND A METHOD OF PREPARING THE SAME

This invention relates to viscous liquid hydrogen peroxide bleaches containing a surfactant for laundry applications, where the viscosity of the solution and its active oxygen content can be stable for long periods of time.

Six percent hydrogen peroxide bleaches have been sold for many years for use in the home to remove stains from laundry. Some of the products in commercial use also contain a surfactant which increases the ability of the bleach for penetrate and remove the stain and improves the overall cleaning performance. The use of such products at the recommended level of about one-half cup to a top loading washing machine, gives an available oxygen concentration of about 60 ppm in the wash solution. The bleach described herein may be applied directly to the stain and the viscosity is such that it remains on the area to which it is applied, whereas current products are so thin that they run off.

Aqueous gels of hydrogen peroxide are known and have found use as a hair bleach, as an antiseptic, and in other applications. Preparations of stable hydrogen peroxide gels containing up to 15% hydrogen peroxide are described in U.S. Pat. No. 3,499,844. It was generally accepted, however, that surfactants tend to destroy the structure of an aqueous gel and prior to the present invention, care was taken to exclude surfactants when formulating aqueous gel systems because substantial amounts of a surfactant were known to break down the gel.

It has now been discovered that it is possible to manufacture stable viscous solutions of hydrogen peroxide having a hydrogen peroxide concentration of up to 30% and preferably about 3 to 8% in the presence of a surfactant. Such compositions may be applied directly to stubborn stains and are exceedingly effective because the viscous liquid does not run off the stain which is subjected to high concentration of hydrogen peroxide in the presence of a surfactant. Moreover, the thickener employed to obtain the desired viscosity is a dispersant and this property is believed to improve the overall performance in the washing machine.

It is most important that the viscosity of the bleach solution be constant with time and that available oxygen is not lost during storage. This can be achieved only through very careful choice of the thickener for the aqueous system, the surfactant, and the order of mixing. As will be further described below, the hydrogen peroxide compositions of the present invention contain at least three other ingredients (1) a thickener to impart the desired viscosity; (2) a neutralizing agent to insure a pH where the thickener is effective; and (3) a surfactant that does not destroy the structure imparted by the thickener. Optionally, the hydrogen peroxide composition of the present invention may contain additional components such as a dye or pigment, an opacifier, a perfume, an organic solvent and an optical brightener.

In accordance with the present invention, a stable viscous aqueous hydrogen peroxide bleach is prepared by adding about 0.5% to 4% of certain anionic or nonionic surfactants to an aqueous hydrogen peroxide solution and then thickening the solution of hydrogen peroxide and surfactant with a water dispersible copolymer of an alpha-beta monoolefinically unsaturated lower aliphatic carboxylic acid crosslinked with a polyether of a polyol selected from the class consisting of oligo saccharides, reduced derivatives thereof in which the carbonyl group is converted to an alcohol group and pentaerythritol, the hydroxyl groups of said polyol which are modified being etherified with allyl groups, said polyol having at least two allyl groups per polyol molecule, by adjusting the pH to the desired range. Examples of commercially available members of this class of resin are the CARBOPOL resins, i.e., CARBOPOL 934, CARBOPOL 940 and CARBOPOL 941, manufactured by B. F. Goodrich Chemical Company, Akron, Ohio. Particularly preferred because of its visual brightness and clarity is CARBOPOL 940.

The basis reagent used to increase the pH of the CARBOPOL solution, and adjust the viscosity, must not react with hydrogen peroxide. Sodium hydroxide is a satisfactory neutralizing agent, triethanol amine is not.

The CARBOPOL resins are believed to be unique in that other commercially available thickeners evaluated for increasing the viscosity of aqueous hydrogen peroxide solutions either did not thicken the solution or lost viscosity within a few days. The effectiveness of commercially available thickeners in increasing the viscosity of the hydrogen peroxide solutions of the present invention is illustrated by Example I and summarized in Table I.

Another unique and unexpected aspect of the present invention is the surfactant that can be incorporated in the viscous aqueous hydrogen peroxide system without loss of available oxygen or destroying the viscous flow charteristics of the solution. Cationic surfactants, such as the quaternary ammonium salts, are incompatible with the anionic CARBOPOL polymer. Derivatives of polyoxyethylene or polyoxypropylene that would react with hydrogen peroxide, for example, mercaptans or amines, are not suitable for use in the compositions of the present invention. Those surfactants that do not adversely effect the solution viscosity or available oxygen upon long storage are:

(1) alkali metal alkyl sulfates; i.e., sodium lauryl sulfates;
(2) linear alkylaryl alkali metal sulfonates;
(3) straight chain primary aliphatic ethoxylated alcohols having a melting point above room temperature; and
(4) block copolymer polyols:
  (a) characterized by a hydrophilic lipophilic balance value determined by the method of Becher & Birkmeier, J. Am. Oil Chem. Soc. 41, 169 (1964) of about 30.5 and a molecular weight of about 4,750; said block copolymer polyol being obtained by adding poly(oxyethylene) groups to a poly(oxypropylene) chain having a molecular weight of about 950;
  (b) characterized by a hydrophilic lipophilic balance value of about 24 and a molecular weight of about 7,500; said block copolymer polyol being obtained by adding poly(oxyethylene) groups to a poly(oxypropylene) chain having a molecular weight of about 2,250;
  (c) characterized by a hydrophilic lipophilic balance value of about 13.5 and a molecular weight of about 4,585; said block copolymer polyol being obtained by adding poly(oxyethylene) groups to a poly(oxypropylene) chain having a molecular weight of about 2,750;

(d) characterized by a hydrophilic lipophilic balance value of about 15 and a molecular weight of about 6,500; said block copolymer polyol being obtained by adding poly(oxyethylene) groups of poly(oxypropylene) chain having a molecular weight of about 3,250; and (e) characterized by a hydrophilic lipophilic balance value of about 22 and a molecular weight of about 13,333; said block copolymer polyol being obtained by adding poly(oxyethylene) groups to a poly(oxypropylene) chain having a molecular weight of about 4,000.

Example II evaluates a large number of commercially available surfactants in viscous aqueous hydrogen peroxide systems from the standpoint of shelf-stability. The effect of varying the amount of surfactant upon solution viscosity is summarized in Table III.

The hydrogen peroxide employed in preparing the stable viscous solutions of the invention may be derived from any source, for example, from the electrolytic process, organic processes such as the anthraquinone process or the like. The concentration of the hydrogen peroxide may be as high as 30% or may be that which is used as a liquid laundry bleach, namely, up to about 15% by weight, and preferably 3 to 8% by weight. It is apparent that in diluting the hydrogen peroxide distilled, deionized or other purified water should be used in order to avoid introduction of metal ions or other contaminants which decompose hydrogen peroxide. Likewise, stability of the hydrogen peroxide may be improved by incorporation of known stabilizers, for example, phenacetin, acetanilide, 8-hydroxyquinolene, the methyl ester of p-hydroxybenzoic acid or other known stabilizers in the amount of a few hundred parts per million, or more. Such stabilizers are present in some commercial products.

The thickening resins employed in the present invention are described in U.S. Pat. No. 2,798,053, and are copolymers of a water dispersible copolymer of an alpha-beta monoolefinically unsaturated lower aliphatic carboxylic acid crosslinked with a polyether of a polyol selected from the class consisting of oligo saccharides, reduced derivatives thereof in which the carbonyl group is converted to an alcohol group and pentaerythritol, the hydroxyl groups of said polyol which are modified being etherified with allyl groups, said polyol having at least two allyl groups per polyol molecule which are readily dispersible in water. A suitable copolymer is one of acrylic acid with low percentages (0.75 to 1.5%) poly allyl sucrose. The poly allyl sucrose preferably contains about 5–8 allyl groups per sucrose molecule, and can be prepared in accordance with Example I of the indicated United States patent; a suitable copolymer can be prepared in accordance with Example II of the patent.

An example of a specific product so prepared is that designated by the trademark "CARBOPOL 934". This product is a colloidally water-soluble copolymer of acrylic acid crosslinked with approximately 1% by weight of an allyl sucrose, the latter material having an average of about 5.8 allyl groups per molecule. This product is prepared by mixing the acrylic acid monomer and the allyl sucrose in the presence of a toluene diluent and 1% of benzoyl peroxide and allowing the reaction to proceed to completion. Upon completion, the diluent, together with unreacted monomer and catalyst, is removed by filtration and subsequent volatilization from the solid polymeric residue. The polymer thereby obtained is in the form of light powder having a maximum particle size of 10 mesh and a bulk density of about 12 pounds per cubic foot. The exact molecular weight is of course unknown, but analysis shows that the product has an equivalent weight (molecular weight per repeating unit) of about 77. The minimum molecular weight, as roughly determined from viscosity measurements is probably about 200,000.

Addition of sodium hydroxide to a dispersion of CARBOPOL resins in the presence of specific surfactants results in the formation of a viscous aqueous liquid having pseudoplastic properties. Typically, these solutions have viscosities in the range of 60 cps to 6,000 cps, as measured with the Brookfield Viscometer, Model LVT, #3 spindle at 6 r.p.m.

The specific surfactants that may be employed in the composition of the present invention are usually present in amounts of from about 0.5 to 4% by weight. As the amount of surfactant is increased above 4 weight percent, the viscous hydrogen peroxide solutions may lose clarity and become cloudy.

The amount of CARBOPOL resin present in the viscous hydrogen peroxide solutions of the present invention is dependent upon the particular CARBOPOL resin used and the desired viscosity. Solutions having a Brookfield viscosity of 60 cps to 6,000 cps may be obtained by adding from about 0.05 to about 0.5 weight percent of a CARBOPOL resin to the hydrogen peroxide solution.

The solution viscosity is also related to pH. The pH may be adjusted from 4.5 to 8 without loss of active oxygen and the preferred range is 5 to 7. When unmodified ultramarine blue is present in the viscous bleach, the pH of the solution should be maintained in the range of 6.5 to 7.5. Ultramarine blue is unstable below pH 6.5 and above ph 7.5 there is some loss of available oxygen with time.

The viscous hydrogen peroxide solutions formed in accordance with the present invention are exceptionally stable. They retain their viscosity with very little loss over extended periods of time, an also are resistant to loss of active oxygen on storage. They retain essentially all of their active oxygen (e.g., 99.5%) even upon storage for as much as 6 months at ambient temperature. This is quite contrary to what normally occurs when surfactants other than those described herein are combined with CARBOPOL resins.

The following examples are presented by way of illustration of our invention only, and are not to be considered as limiting the scope thereof in any way.

EXAMPLE I

A series of 24 commercially available thickening agents are evaluated by adding 1% by weight of each thickening agent to a 6% hydrogen peroxide solution (FMC Technical Grade). Except for carboxymethyl cellulose, all agents thickened the solution. Viscosity was lost, however, within 2 days except for the CARBOPOL solutions. CARBOPOL solutions neutralized with triethanolamine lost viscosity after 4 days, whereas those neutralized with sodium hydroxide retained viscosity for over 10 months. The data on the 24 thickening agents evaluated in this Example I are summarized in Table I.

EXAMPLE II (a) A clear viscous hydrogen peroxide control solution is prepared by adding 0.133 weight percent of CARBOPOL 940 to a 6% solution of hydrogen peroxide (FMC Technical Grade) and adjusting the pH of the solution with sodium hydroxide to 5.0. The hydrogen peroxide solution so obtained has a viscosity of 4,420 cps, measured with the Brookfield Viscometer, Model LVT, #3 spindle at 6 r.p.m. (viscosity 780 cps at 60 r.p.m.).

(b) Numerous nonionic surfactants are evaluated at concentrations of 1% by weight in a viscous hydrogen peroxide - CARBOPOL system. The procedure described in this Example, paragraph (a) above is repeated except that one weight percent of a surfactant is added to the 6% hydrogen peroxide solution (FMC Technical Grade) prior to addition of the CARBOPOL 940, and pH adjustment. The pH of the Grade) is added 0.5 weight percent of a sodium alkyl benzene sulfonate (sold under the trade name SULFRAMIN by Witco, Organics Division, 277 Park Avenue, New York, N.Y. 10017). To this solution is added with stirring 0.133 weight percent CARBOPOL 940. The solution after addition of the CARBOPOL resin is adjusted to pH 5.0 with aqueous sodium hydroxide. The viscous hydrogen peroxide solution so obtained has a Brookfield viscosity of 160 cps (6 r.p.m.). After 5 months storage at room temperature, this liquid bleach has a Brookfield viscosity of 160 cps and had retained 100% of the available oxygen. Similar formulations prepared by the method described in this Example containing different quantities of CARBOPOL and SULFRAMIN are reported in Table III.

TABLE I
THICKENING AGENTS TESTED

| Manufacturer | Trade Name | Chemical Classification | Viscosity Stability After One Month |
|---|---|---|---|
| Alco | Alcogum L-11 | Sodium polyacrylate | No |
|  | Alcogum 6625 | Sodium polyacrylate | " |
| Dow | Separan CP 7 | Cationic polyacrylamide | " |
|  | Separan AP 30 | Polyacrylamides | " |
|  | AP 273 |  |  |
|  | MG L |  |  |
|  | MG 200 |  |  |
|  | NP 10 |  |  |
| GAF | Gantrez AN 4651 | Poly (methyl vinyl ether/maleic anhydride) | " |
|  | NP-K30 | polyvinyl pyrrolidone |  |
| Goodrich, B. F. | Carbopol 934 | Carboxy vinyl polymers | Yes |
|  | 940 |  | Yes |
|  | 941 |  | Yes |
| Hall, C. P. | Emulvis | Polyethylene stearate | No |
| Hercules | CMC 7MT | Carboxymethyl cellulose | " |
| Hodag | Hodag C-100-T-AC | Cationic amine acetate | " |
|  | Hodag GMS | Glycerol monostearate | " |
|  | Hodag PEG 6000 | Polyethylene glycol | " |
|  | Sole-Terge AC50 | K salt coc amino polyethoxy sulfate | " |
| Nopco | Hyonic FA-40 | Fatty alkylamide | " |
|  | Hyonic FA-70 | Fatty alkylamide | " |
| Rohm & Haas | Acrysol GS | Sodium polyacrylate | No |
| Staley, A. E. | Elvanol T-25 | Polyvinyl alcohol | " |
| Union Carbide | Carbowax 6000 | Polymerized polyethylene glycol | " | solution is adjusted to 5.0 with sodium hydroxide, and the initial viscosity immediately after the neutralization step is measured with a Brookfield Viscometer (at 6 r.p.m. and 60 r.p.m.) as described above in paragraph (a). The surfactants tested in this manner are listed and identified in Table II which summarizes the stability of the hydrogen peroxide solution after 1 month.

EXAMPLE III

Various anionic surfactants were also evaluated. To a 6% solution of hydrogen peroxide (FMC Technical

EXAMPLE IV

To a 6% solution of hydrogen peroxide (FMC Technical Grade) is added 1.0 weight percent of sodium lauryl sulfate, (sold under the trade name DuPONOL ME DRY by E. I. DuPont de Nemours, Wilmington, Delaware). To this solution is added with stirring 0.333 weight percent of CARBOPOL 940.

TABLE II

| Manufacturer | Surfactant Trade Name | Chemical Classification | Solution Appearance | Initial Viscosity (cps)[1] | | Was Viscosity Stable For One Month |
|---|---|---|---|---|---|---|
|  | None |  | Clear | 4420, | 780 | Yes |
| BASF | Plurafac | Oxyethylated straight chain alcohols |  |  |  |  |
|  | A-16 |  | Cloudy | 1740, | 376 | No |
|  | A-26 |  | Clear | 1380, | 296 | No |
|  | A-38 |  | Clear | 1480, | 322 | Yes |
|  | B-26 |  | Clear | 1340, | 286 | No |
|  | RA-20 |  | Clear | 2200, | 426 | No |
|  | RA-30 |  | Clear | 1560, | 338 | No |
|  | RA-40 |  | Cloudy | Incompatible, phase separation |  | — |
|  | RA-43 |  | Clear | 2160, | 444 | No |
|  | RA-50 |  | Clear | 1420, | 306 | No |
|  | pluronics | Polyols[2] |  |  |  |  |
|  | F38[a] |  | Clear | 1760, | 366 | Yes |
|  | F68 |  | Clear | 1640, | 350 | Reduced |
|  | F77 |  | Clear | 1040, | 238 | Reduced |
|  | F87[b] |  | Clear | 2160, | 448 | Yes |
|  | F88 |  | Clear | 1360, | 308 | No |
|  | F98 |  | Clear | 1560, | 350 | No |

TABLE II-continued

| Manufacturer | Surfactant Trade Name | Chemical Classification | Solution Appearance | Initial Viscosity (cps)[1] | | Was Viscosity Stable For One Month |
|---|---|---|---|---|---|---|
| | F108 | | Clear | 520, | 142 | No |
| | F127[e] | | Clear | 2100, | 446 | Yes |
| | L31 | | Clear | 1460, | 316 | No |
| | L35 | | Clear | 1900, | 382 | No |
| | L42 | | Clear | 1500, | 320 | No |
| | L43 | | Clear | 1840, | 374 | No |
| | L44 | | Clear | 1000, | 236 | No |
| | L61 | | Cloudy | 980, | 228 | No |
| | L62 | | Clear | 1640, | 348 | No |
| | L63 | | Clear | 2060, | 386 | No |
| | L64 | | Clear | 2440, | 454 | No |
| | L72 | | Cloudy | 920, | 226 | No |
| | L92 | | Clear | 1620, | 354 | No |
| | L121 | | Cloudy | 1740, | 424 | No |
| | L122 | | Hazy | 1400, | 336 | No |
| | P65 | | Clear | 1060, | 242 | No |
| | P75 | | Clear | 1780, | 354 | No |
| | P84 | | Clear | 1400, | 298 | No |
| | P85 | | Clear | 1980, | 396 | No |
| | P94[c] | | Clear | 860, | 210 | Yes |
| | P103 | | Clear | 1340, | 288 | No |
| | P104 | | Clear | 1060, | 238 | No |
| | P105[d] | | Clear | 1260, | 274 | Yes |
| | 25R2 | | Clear | 1320, | 292 | No |
| BASF | Plurodot HA-433 | Trifunctional polyoxyalkylene glycols | Turbid | Incompatible, phase separation | | — |
| Emory | Emid 6510 | Lauric diethanol amide | Clear | 120, | 22 | No |
| GAF | Igepal C0530 | Nonyl phenoxy poly(ethylene oxy) ethanol | Cloudy | 1420, | 330 | No |
| ICI | Monflor 51 | Fluorocarbons with highly branched perfluoro groups | Clear | 460, | 126 | No |
| | Monflor 52 | Fluorocarbons with highly branched perfluoro groups | Cloudy | 340, | 102 | No |
| Mona | Monamide CMA | Coco monoethanol-amide | Turbid | <10 | | — |
| | Monamide LMA | Lauryl monoethanol-amide | Turbid | <10 | | — |
| Minnesota Mining & Manufacturing | Fluorad FC-170 | Fluorinated alkyl polyoxyethylene ethanols | Cloudy | 2760, | 550 | No |
| | Fluorad FC-430 | Fluorinated alkyl ester | Clear | 2280, | 494 | No |
| Nopco | Nopalcol 10-L | Polyoxymethylene monolaurate | | | | |
| Rohm & Haas | Triton CF 10 | Alkyl aryl polyether | Cloudy | <10 | | — |
| | Triton X-100 | Octyl phenoxy polyethoxy ethanol | Clear | 580, | 152 | No |
| Shell | Neodol 25-9 | $C_{12}$—$C_{15}$ linear primary alcohol ethoxylate | Clear | 1000, | 228 | No |

[1]The thickened solutions are "pseudoplastic", where flow is increased by applying stress. The viscosities were measured using a Brookfield viscometer with spindle speeds of 6 rpm (first number) and 60 rpm (second number). A viscosity of <10 cps is water consistency. Glycerin has a viscosity of about 1000 cps.
[2]Condensates of ethylene oxide with hydrophobic bases formed by condensing propylene oxide with propylene glycol except for Pluronic 25R2 where ethylene oxide/ethylene glycol replaced propylene glycol.
[a]block copolymer polyols characterized by a hydrophilic lipophilic balance value of about 30.5 and a molecular weight of about 4,750; said block copolymer polyol being obtained by adding poly(oxyethylene) groups to a poly(oxypropylene) chain having a molecuular weight of about 950.
[b]characterized by hydrophilic lipophilic balance value of about 24 and a molecular weight of about 7,500; said block copolymer polyol being obtained by adding poly(oxyethylene) groups to a poly(oxypropylene) chain having a molecular weight of about 2,250.
[c]characterized by a hydrophilic lipophilic balance value of about 13.5 and a molecular weight of about 4,585; said block copolymer polyol being obtained by adding poly(oxyethylene) groups to a poly(oxypropylene) chain having a molecular weight of about 2,750.
[d]characterized by a hydrophilic lipophilic balance value of about 15 and a molecular weight of about 6,500; said block copolymer polyol being obtained by adding poly(oxyethylene) groups to a poly(oxypropylene) chain having a molecular weight of about 3,250.
[e]characterized by a hydrophilic lipophilic balance value of about 22 and a molecular weight of about 13,333; said block copolymer polyol being obtained by adding poly(oxyethylene) groups to a poly(oxypropylene) chain having a molecular weight of about 4,000.

TABLE III

| Manufacturer | Surfactant Trade Name | Chemical Class. | Conc. (Wt. %) | CARBOPOL 940 Conc. (Wt.) | Initial Viscosity (cps) | Was Viscosity Stable After One Month? |
|---|---|---|---|---|---|---|
| E. I. DuPont de Nemours | DuPONOL ME DRY | Alkali metal alkyl sulfate | 0.5 | 0.133 | 160; 68 | Yes |
| | | | 1.0 | 0.266 | 500; 136 | Yes |
| Witco | SULFRAMIN | Alkyl benzene sulfonate | 0.5 | 0.133 | 276; 89 | Yes |
| | | | | 0.166 | 1,000; 240 | Yes |
| | | | | 0.2 | 1,080; 296 | Yes |
| | | | | 0.266 | 1,160; 296 | Yes |
| | | | 1.0 | 0.266 | <100 | Yes |
| | | | | 0.333 | 180; 72 | Yes |

TABLE III-continued

| Manufacturer | Trade Name | Surfactant Chemical Class. | Conc. (Wt. %) | CARBOPOL 940 Conc. (Wt.) | Initial Viscosity (cps) | Was Viscosity Stable After One Month? |
|---|---|---|---|---|---|---|
| GAF | Gafac RD 510 | Acid organic phosphate ester | 0.5 | 0.133 | 160; 72 | No |
| Hodag | Sole Terge 8 (35% active) | Oleic acid isopropanol amide sulfosuccinate | 0.5 | 0.133 | 120; 34 | No |
| Shell | Neodol 25-3S (58% active) | alcohol ethoxy sulfate | 0.5 | 0.133 | 160; 68 | No |
|  |  |  |  | 0.166 | 920; 226 | No |
|  |  |  |  | 0.2 | 1,340; 290 | No |
|  |  |  | 1.0 | 0.2 | 360; 106 | No |
|  |  |  |  | 0.233 | 1,180; 278 | No |
|  |  |  |  | 0.266 | 2,360; 536 | No |
|  |  |  | 1.7 | 0.266 | 160; 66 | No |
|  |  |  |  | 0.299 | 880; 186 | No |
|  |  |  |  | 0.333 | 1,280; 300 | No |

The CARBOPOL is adjusted to (pH 5.0) with sodium hydroxide to give a stable viscous hydrogen peroxide solution having a Brookfield viscosity of 500 cps (6 r.p.m.). The viscosity of this solution remained unchanged after 1 month storage at ambient temperature. A similar formulation prepared by the method described in this Example containing different proportions of CARBOPOL and DUPONOL ME DRY is reported in Table III which compares the unique surfactants employed in the present invention with other anionic surfactants.

EXAMPLE V

To a 6% aqueous solution of hydrogen peroxide (FMC Technical Grade) is added 0.5 weight percent of an anionic surfactant. (DuPONOL ME DRY) and 0.5 weight percent of a nonionic surfactant (PLURONIC P 94). To this mixture is added 0.133 weight percent CARBOPOL 940 and the solution is adjusted to pH 5.0 with sodium hydroxide. The viscous liquid bleach so obtained retains its viscosity for 1 month at ambient temperature and at the end of 1 month retained 99.7% of the available oxygen originally present.

EXAMPLE VI

To a 6 weight percent hydrogen peroxide solution (FMC Super D Grade) is added 1% by weight PLURONIC P 94, 0.166 weight percent CARBOPOL 940, and sufficient 10% aqueous sodium hydroxide to adjust the pH to 6.7. To the viscous hydrogen peroxide solution so obtained is then added 0.17 weight percent of ultramarine blue pigment. After 1 month storage at room temperature, this solution is physically and chemically stable.

EXAMPLE VII

To a 6 weight percent hydrogen peroxide (FMC Super D Grade) solution is added 1 weight percent DuPONOL ME DRY, 0.266 weight percent CARBOPOL 940 and sufficient 10% sodium hydroxide solution to adjust the pH to 6.7. To this viscous liquid bleach is then added 0.17 weight percent ultramarine blue pigment. After 1 month storage at room temperature, this solution is physically and chemically stable. For optimum storage life an ultramarine blue that is stabilized for use in an acid environment may be employed.

EXAMPLE VIII

A stable opaque liquid bleach is prepared by adding to a 6 weight percent hydrogen peroxide solution (FMC Super D Grade) 1 weight percent PLURONIC P 94 and 0.166 weight percent CARBOPOL 940. The solution is adjusted to 5.0 with sodium hydroxide and 0.07 weight percent of a copolymer latex opacifier (E 153 manufactured by Morton Chemical Company, Division of Morton Norwich Products, Inc., 1275 Lake Avenue, Woodstock, Illinois 60048) is added. To the opaque viscous hydrogen peroxide solution so obtained is added 0.002 weight percent of ERIO BLUE GRL DYE, manufactured by Ciba/Geigy (Dyestuff & Chemical Division, Greensboro, North Carolina 27409). After 1 month storage at room temperature, this solution remained physically and chemically stable.

EXAMPLE IX

In tests measuring tea stain removal from cotton, an increase in performance of 24% is observed when 0.133 weight percent CARBOPOL 940 and 0.023 weight percent sodium hydroxide is added to a 6 weight percent hydrogen peroxide solution (FMC Technical Grade) containing 1% PLURONIC P 94. The control bleach applied to the control stain contains 6% hydrogen peroxide and 1% PLURONIC P 94 surfactant, but has the viscosity of water as it contains no CARBOPOL 940. In both instances, the stained samples were washed 10 minutes after the bleach was applied.

The comparison between the bleach containing CARBOPOL and the control bleach containing no CARBOPOL is made at 120° F. in a Tergotometer (manufactured by U.S. Testing Co., Inc., Hoboken, N.J.). Both tests are run at 60 ppm available oxygen and 0.15 weight percent non-phosphate laundry detergent. Table IV summarizes the difference in reflectance as determined with a Hunter Reflectometer (manufactured by Hunter Associates Laboratory, Inc., Fairfax, Va.

TABLE IV

|  | Δ Reflectance |
|---|---|
| 6% hydrogen peroxide + 1% PLURONIC P 94 | 10.0 |
| Thickener + 6% hydrogen peroxide + 1% PLURONIC P 94 | 12.4 |

EXAMPLE X

A viscous liquid bleach is formulated by the procedure described in Example III above to have the following composition:

|  | Weight Percent |
|---|---|
| Hydrogen peroxide (FMC Technical Grade) | 6.0 |
| PLURONIC F127 | 1.0 |

| | Weight Percent |
|---|---|
| CARBOPOL 941 | 0.133 |
| Sodium hydroxide to adjust pH to 5.0 | |

The viscous liquid bleach so obtained has an initial Brookfield viscosity when prepared of 1,300 cps (6 r.p.m.) and 350 cps (60 r.p.m.); after 10 months storage at room temperature, the Brookfield viscosity is 1,280 cps (6 r.p.m.) and 304 cps (60 r.p.m.). There is no loss in available oxygen.

EXAMPLE XI

A viscous liquid bleach is formulated by the procedure described in Example III above to give the following composition:

| | Weight Percent |
|---|---|
| Hydrogen peroxide (FMC Technical Grade) | 6.0 |
| PLURONIC F127 | 1.0 |
| CARBOPOL 934 | 0.226 |
| Sodium hydroxide | 0.046 |

The product so obtained has a pH of 5 and an initial Brookfield viscosity of 2,040 cps (6 r.p.m.) and 568 cps (60 r.p.m.).

After 9 months storage at room temperature, the Brookfield viscosity is 1,940 cps (6 r.p.m.) and 520 cps (60 r.p.m.). The available oxygen remains unchanged at 6% hydrogen peroxide.

EXAMPLE XII

A viscous bleach is formulatd by the procedure described in Example III above to have the following composition:

| | Weight Percent |
|---|---|
| Hydrogen peroxide (FMC Technical Grade) | 6.0 |
| PLURONIC P 94 | 1.0 |
| CARBOPOL 940 | 0.133 |
| Sodium hydroxide | (adjust to pH 5.0) |

The viscous bleach so obtained is stable on storage for a period of 6 months.

EXAMPLE XIII

To the viscous bleach described in Example XII above is added with rapid stirring 10 weight percent of perchloroethylene. A stable emulsion is formed that is useful in the pre-treatment of laundry and has excellent shelf stability.

EXAMPLE XIV

A stable viscous surfactant solution is prepared by adding to an aqueous 1% solution of DuPONOL ME DRY, 0.2% by weight CARBOPOL 940.

Addition of sodium hydroxide to adjust the pH to 5.5 results in a stable surfactant solution that is useful in the manufacture of oil in water emulsions.

EXAMPLE XV

Ten weight percent of perchloroethylene is added with rapid stirring to the viscous solution of surfactant and described in Example XIV above. The dispersion so obtained is an effective metal cleaner, and is stable on storage for 6 months.

EXAMPLE XVI

A viscous bleach is formulated in accordance with the procedure described in Example III above to have the following composition:

| | Weight Percent |
|---|---|
| Hydrogen peroxide (FMC Technical Grade) | 6.0 |
| PLURONIC P 94 | 1.0 |
| CARBOPOL 940 | 0.133 |
| Phorwite BBU* | 0.20 |
| Sodium hydroxide | (adjust to pH 5.0) |

*Phorwite BBU is an optical brightener manufactured by Venoma Verona Development, Baychem Corp., P. O. Box 385, Union Metropolitan Park, Union, New Jersey 07083

The viscous bleach so obtained is stable on storage for 6 months.

EXAMPLE XVII

A viscous bleach is formulated in accordance with the procedure described in Example III above to give the following composition:

| | Weight Percent |
|---|---|
| Hydrogen peroxide (FMC Technical Grade) | 30.0 |
| PLURONIC P 94 | 1.0 |
| CARBOPOL 940 | 0.133 |
| Sodium hydroxide | (adjust to pH 5.0) |

The viscous hydrogen peroxide solution so obtained has a Brookfield viscosity of 1,020 cps (6 r.p.m.). After 6 months storage at room temperature, the viscosity of this liquid bleach is essentially unchanged.

EXAMPLE XVIII

A stable liquid bleach is prepared by adding to a 6 weight percent (FMC Technical Grade) hydrogen peroxide solution 0.5 weight percent PLURONIC F127, 0.133 weight percent CARBOPOL 940 and sufficient sodium hydroxide to adjust the pH to 5.0. The viscosity of the resulting solution is 2,800 cps (6 r.p.m.) and 604 cps (60 r.p.m.).

Increasing the amount of PLURONIC F127 present has the following effect on viscosity:

| Percent PLURONIC F127 | Viscosity cps. 60 rpm - 6 rpm |
|---|---|
| 0.5 | 2,800 – 604 |
| 1.0 | 2,100 – 446 |
| 2.0 | 1,760 – 368 |
| 4.0 | 680 – 198 |
| 5.0 | 1,880 – 444 |
| 6.0 | 1,800 – 404 |
| 10.0 | 4,240 – 1,084 |

EXAMPLE XIX

A thickened solution is prepared by adding to dionized water 1.0 weight percent PLURONIC P 94, 0.067 weight percent CARBOPOL 940, and the pH adjusted to 5.0 using sodium hydroxide solution. The solution has a Brookfield viscosity of 1,740 (6 rpm). After 1 month storage at room temperature the viscosity is 1,720. After 1 month the viscosity had not changed appreciably.

EXAMPLE XX

To a 6 weight percent hydrogen peroxide solution (FMC Super D Grade) is added 1% by weight PLURONIC P 94, 0.233 weight percent CARBOPOL 940, and sufficient 10% aqueous sodium hydroxide to adjust the pH to 5.0. The hydrogen peroxide solution so obtained has a Brookfield viscosity of 6,000 cps (6 rpm). After 1 month storage at room temperature, this solution is physically and chemically stable.

EXAMPLE XXI

To a 6 weight percent hydrogen peroxide solution (FMC Super D Grade) is added 1% by weight PLURONIC P 94, 0.1 weight percent CARBOPOL 940, and sufficient 10% aqueous sodium hydroxide to adjust the pH to 5.0. The hydrogen peroxide solution so obtained has a Brookfield viscosity of 60 cps (6 rpm). After 1 month storage at room temperature, this solution is physically and chemically stable.

EXAMPLE XXII

In preparing the hydrogen peroxide compositions of the present invention, the order of addition is critical to the viscosity stability of the formulation.

(a) To a 6% hydrogen peroxide solution (FMC Technical Grade) is added 0.133 weight percent CARBOPOL 940 and then 1% by weight PLURONIC F87. The addition of sodium hydroxide to adjust the pH to 5.0 gave a solution having a Brookfield viscosity of 3,240. The viscosity was lost after 7 days.

(b) To a 6% hydrogen peroxide solution (FMC Technical Grade) is added 1% by weight PLURONIC F87 and then 0.133 weight percent CARBOPOL 940. The addition of sodium hydroxide to adjust the pH to 5.0 resulted in a solution viscosity of 2,161 cps which is essentially unchanged after 7 days storage at room temperature.

The viscous hydrogen peroxide solutions formed in accordance with the present invention are exceptionally stable. They retain their viscosity with very little viscosity change over an extended period of time. They retain essentially all of their active oxygen (e.g., 99.5%) even upon storage for as much as a year at ambient temperature.

Although the majority of the preceding Examples contain hydrogen peroxide, the presence of which illustrates the chemical stability of the viscous surfactant solutions, it will be understood from Examples XIV and XV that the present invention is not so limited. Those skilled in the art will understand that the stable viscous surfactant solutions described above may be used as a carrier to dissolve or disperse natural and synthetic oils, organic solvents, pigments, pesticides, abrasives, etc., all of which may be applied in viscous liquid form.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art and having the benefit of this disclosure, otherwise than as specifically described and exemplified herein.

What is claimed is:

1. A stable viscous aqueous solution of hydrogen peroxide having a viscosity within the range of about 60 cps-6000 cps consisting essentially of from about 3% to about 30% hydrogen peroxide and as a thickening agent from about 0.05 to about 0.5 weight percent of a water dispersible cross-linked interpolymer of a monomeric mixture comprising a monomeric polymerizable alpha-beta monoolefinically unsaturated lower aliphatic carboxylic acid, and a polyether of a polyol selected from the class consisting of oligo saccharides, reduced derivatives thereof in which the carbonyl group is converted to an alcohol group and pentaerythritol, the hydroxyl groups of said polyol which are modified being etherified with allyl groups, said polyol having at least two allyl ether groups per polyol molecule, and from about 0.5 to 4.0 weight percent of a surfactant selected from the group consisting of:
   (1) alkali metal alkyl sulfates;
   (2) linear alkylaryl alkali metal sulfonates;
   (3) straight chain primary aliphatic ethoxylated alcohols having a melting point above room temperature; and
   (4) block copolymer polyols;
      (a) characterized by a hydrophilic lipophilic balance value of about 30.5 and a molecular weight of about 4,750; said block copolymer polyol being obtained by adding poly(oxyethylene) groups to a poly(oxypropylene) chain having a molecular weight of about 950;
      (b) characterized by a hydrophilic lipophilic balance value of about 24 and a molecular weight of about 7,500; said block copolymer polyol being obtained by adding poly(oxyethylene) groups to a poly(oxypropylene) chain having a molecular weight of about 2,250;
      (c) characterized by a hydrophilic lipophilic balance value of about 13.5 and a molecular weight of about 4,585; said block copolymer polyol being obtained by adding poly(oxy-ethylene) groups to a poly(oxypropylene) chain having a molecular weight of about 2,750;
      (d) characterized by a hydropholic lipophilic balance value of about 15 and a molecular weight of about 6,500; said block copolymer polyol being obtained by adding poly(oxyethylene) groups to a poly(oxypropylene) chain having a molecular weight of about 3,250;
      (e) characterized by a hydrophilic lipophilic balance value of about 22 and a molecular weight of about 13,333; said block copolymer polyol being obtained by adding poly(oxyethylene) groups to a poly(oxypropylene) chain having a molecular weight of about 4,000.

2. The stable viscous aqueous solution of claim 1 having a pH in the range of about 4.5 to about 8.

3. The stable viscous aqueous solution of claim 1 containing from about 3 to about 8% hydrogen peroxide.

4. The stable viscous aqueous solution of claim 1 having a pH in the range of 6.5 to 7.5 and containing ultramarine blue pigment.

5. The stable viscous aqueous solution of claim 1 containing as the thickening agent a water dispersible copolymer of acrylic acid crosslinked with 0.75 to 1.5% by weight of a poly allyl sucrose having 5-8 allyl groups per molecule.

6. The stable viscous aqueous solution of claim 1 wherein said surfactant is an alkali metal alkyl sulfate.

7. The stable viscous aqueous solution of claim 1 wherein said surfactant is a linear alkylaryl alkali metal sulfonate.

8. The stable viscous aqueous solution of claim 1 wherein said surfactant is a straight chain primary aliphatic ethoxylated alcohol having a melting point above room temperature.

9. The stable viscous aqueous solution of claim 1 wherein said surfactant is a block copolymer polyol.

10. The stable viscous aqueous solution of claim 1 having dispersed therein perchloroethylene.

11. The stable viscous aqueous solution of claim 1 having dispersed therein an opacifier.

12. A method of preparing a viscous aqueous solution of hydrogen peroxide having a hydrogen peroxide concentration in the range of from about 3% to about 30% and a viscosity within the range of about 60 cps-6,000 cps which is stable against loss of active oxygen and retains its viscosity on storage, which consists essentially of the steps of (1) mixing aqueous hydrogen peroxide having a concentration of up to 30% by weight with from about 0.5 to about 4.0% by weight of a surfactant selected from the group consisting of:
(a) alkali metal alkyl sulfates;
(b) linear alkylaryl alkali metal sulfonates;
(c) straight chain primary aliphatic ethoxylated alcohols having a melting point above room temperature; and
(d) block copolymer polyols;
  (i) characterized by a hydrophilic lipophilic balance value of about 30.5 and a molecular weight of about 4,750; said block copolymer polyol being obtained by adding poly(oxyethylene) groups to a poly(oxypropylene) chain having a molecular weight of about 950;
  (ii) characterized by a hydrophilic lipophilic balance value of about 24 and a molecular weight of about 7,500; said block copolymer polyol being obtained by adding poly(oxyethylene) groups to a poly(oxypropylene) chain having a molecular weight of about 2,250;
  (iii) characterized by a hydrophilic lipophilic balance value of about 13.5 and a molecular weight of about 4,585; said block copolymer polyol being obtained by adding poly(oxyethylene) groups to a poly(oxypropylene) chain having a molecular weight of about 2,750;
  (iv) characterized by a hydrophilic lipophilic balance value of about 15 and a molecular weight of about 6,500; said block copolymer polyol being obtained by adding poly(oxyethylene) groups to a poly(oxypropylene) chain having a molecular weight of about 3,250;
  (v) characterized by a hydrophilic lipophilic balance value of about 22 and a molecular weight of about 13,333; said block copolymer polyol being obtained by adding poly(oxyethylene) groups to a poly(oxypropylene) chain having a molecular weight of about 4,000;
(2) adding to the solution of hydrogen peroxide and surfactant so obtained from about 0.05 to 0.5 weight percent of a water dispersible cross-linked interpolymer of a monomeric mixture comprising a monomeric polymerizable alpha-beta monoolefinically unsaturated lower aliphatic carboxylic acid, and a polyether of a polyol selected from the class consisting of oligo saccharides, reduced derivatives thereof in which the carbonyl group is converted to an alcohol group and pentaerythritol, the hydroxyl groups of said polyol which are modified being etherified with allyl groups, said polyol having at least two allyl ether groups per polyol molecule, and (3) adjusting the pH of the resulting solution to within the range of 4.5 to 8.0.

13. The method of claim 12 in which the pH of the resulting solution is adjusted with an alkali metal hydroxide.

14. The method of claim 12 in which the aqueous hydrogen peroxide has a concentration of about 3 to about 8% and the water dispersible cross-linked interpolymer is a copolymer of acrylic acid crosslinked with 0.75 to 1.5% by weight of poly allyl sucrose having 5–8 allyl groups per molecule.

* * * * *

UNITED STATES PATENT OFFICE
CERTIFICATE OF CORRECTION

PATENT NO. : 4,130,501
DATED : December 19, 1978
INVENTOR(S) : Charles W. Lutz and Leon E. Cohen It is certified that error appears in the above-identified patent and that said Letters Patent are hereby corrected as shown below:

Column 1, line 15, "for" should read --to--. Column 2, line 15, "basis" should read --basic--; second column, line 32, "charteristics" should read --characteristics--. Column 3, line 4, "of" should read --to a--. Column 4, line 36, "ph" should read --pH--; column 4, line 41, "an" should read --and--. Column 5, Table II, under Surfactant Trade Name, "pluronics" should read --Pluronics--. Column 10, line 51, "Va." should read --Va.)--. Column 11, line 60, "stable surfactant" should read --stable viscous surfactant--. Column 12, line 13, "Venoma Verona Develop-" should read --Verona Develop---; column 12, line 61, "dion-" should read --deion---. Column 14, line 39, claim 1, "poly(oxyethylene)" should read --poly(oxyethylene)--.

Signed and Sealed this

First Day of May 1979

[SEAL]

Attest:

RUTH C. MASON
Attesting Officer

DONALD W. BANNER
Commissioner of Patents and Trademarks